United States Patent [19]

Guerin et al.

[11] Patent Number: 4,649,325
[45] Date of Patent: Mar. 10, 1987

[54] SCANNING CRT CONTROL SYSTEM

[75] Inventors: Thomas R. Guerin, Hoffman Estates; Theodore V. Lester, Schiller Park, both of Ill.

[73] Assignee: Motorola, Inc., Schaumburg, Ill.

[21] Appl. No.: 820,778

[22] Filed: Jan. 21, 1986

[51] Int. Cl.[4] .............................................. H01J 29/52
[52] U.S. Cl. .................................... 315/383; 315/370; 315/411
[58] Field of Search ............... 315/383, 386, 370, 411; 358/219, 74

[56] References Cited

U.S. PATENT DOCUMENTS

| | | | |
|---|---|---|---|
| 3,816,793 | 6/1974 | Radloff et al. | 315/29 |
| 3,898,523 | 8/1975 | Wessel | 315/408 |
| 3,912,972 | 10/1975 | Otten et al. | 315/411 |
| 3,949,269 | 4/1976 | Wheeler | 315/371 |
| 3,980,822 | 9/1976 | Suzuki et al. | 358/74 |
| 4,153,862 | 5/1979 | Lim | 315/408 |
| 4,184,104 | 1/1980 | Shouse, Jr. | 315/386 |
| 4,234,827 | 11/1980 | Willis | 315/408 |
| 4,503,367 | 3/1985 | Wedam et al. | 315/371 |

OTHER PUBLICATIONS

Motorola Schematic Diagram No. 63D25575A48.

*Primary Examiner*—Theodore M. Blum
*Attorney, Agent, or Firm*—Phillip H. Melamed

[57] ABSTRACT

A scanning CRT control system is disclosed in which horizontal sync pulses are used to develop a pulse signal that provides an input to a transformer circuit also receiving a relatively low DC power supply input signal. The transformer circuit develops a very high DC voltage connected to a CRT screen while also providing a relatively lower voltage power supply signal that is utilized to develop the power supply signal provided to a video driver that controls beam excitation for the CRT. A compensation circuit is provided between the transformer circuit and a power supply terminal of the video driver such that a compensating signal is provided at the transformer circuit in accordance with each horizontal video scan line. The compensating signal has a frequency corresponding to the horizontal sweep frequency and a magnitude that varies in accordance with the average current loading of each individual horizontal scan line. In this manner the compensating signal will cause a variation in horizontal beam positioning so as to maintain horizontal orientation between different sequential horizontal scan lines regardless of the average beam current intensity of each of the horizontal scan lines. Preferably, the compensation circuit comprises a parallel resistor and capacitor connected in series between an output terminal of the transformer and the power supply terminal of the video driver.

10 Claims, 4 Drawing Figures

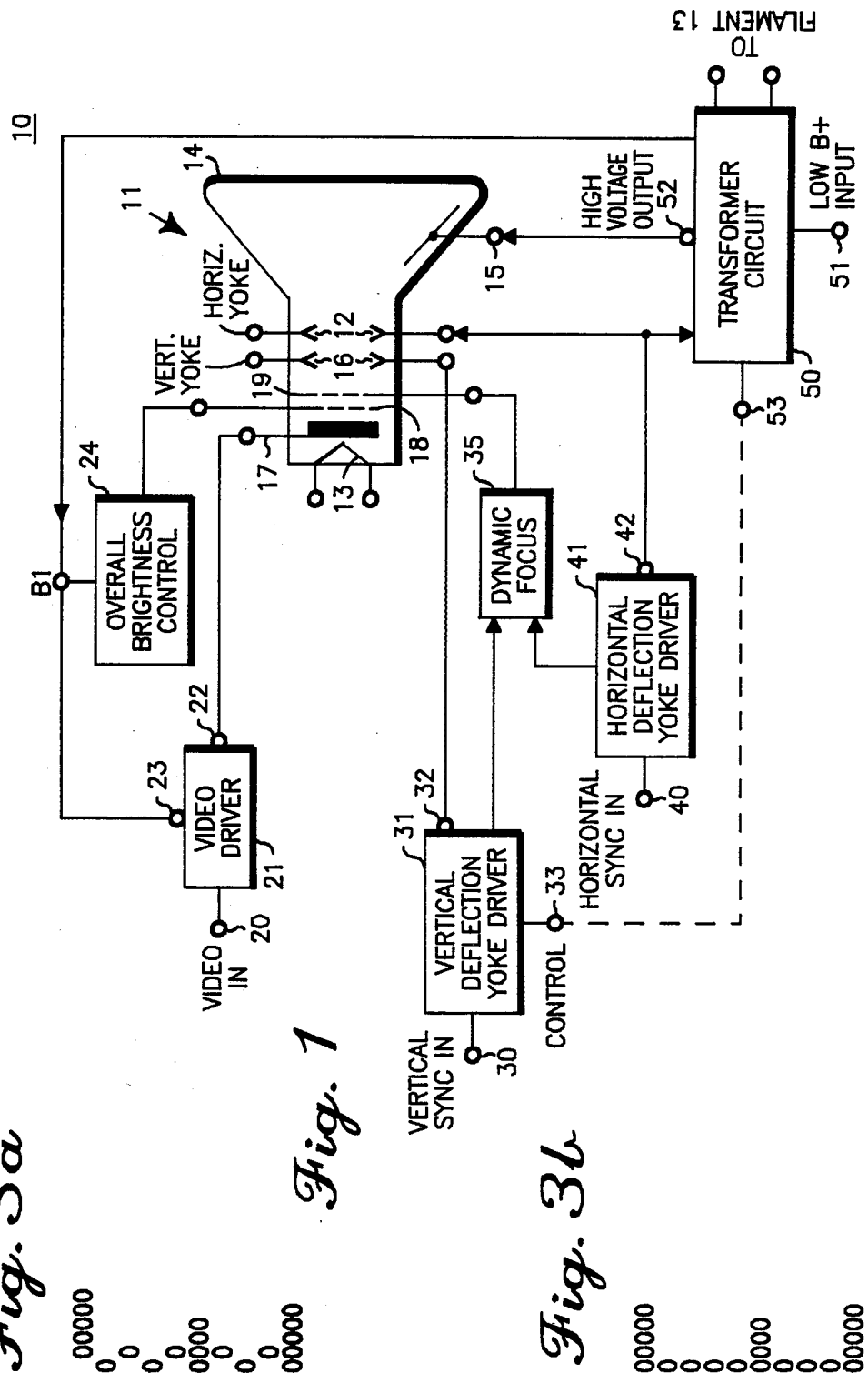

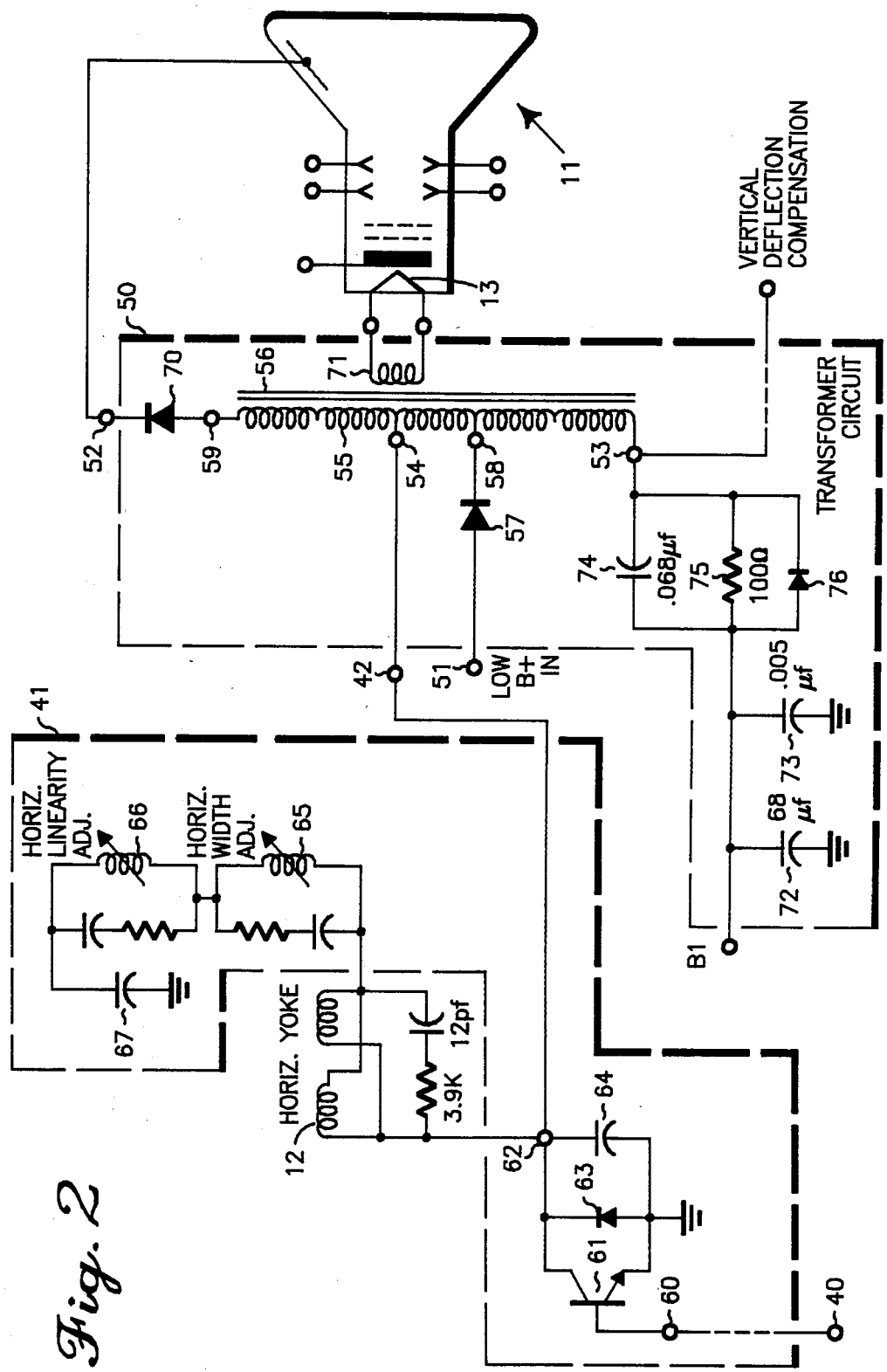

SCANNING CRT CONTROL SYSTEM

BACKGROUND OF THE INVENTION

In conventional scanning CRT systems, misregistration between various different sequential horizontal scan lines in a video picture frame may occur due to differences in the amount of average beam current (intensity) drawn by each of the different horizontal scan lines. Typically the amount of horizontal misregistration is relatively small and goes unnoticed unless graphics data having known vertical orientations are to be produced. In such cases, the horizontal misregistration may still not appear excessive unless even block interlace excitation of graphics block letters is to be provided wherein the effect is magnified, especially for conditions where reverse video (black letters on a white background) is produced.

The horizontal misalignment between different average current scan lines is typically caused by variations in the CRT high voltage signal which is produced. These variations exist because for different average beam currents for each horizontal line a variation in the high voltage of the CRT screen may be produced. In order to prevent this problem it may be possible to maintain the high voltage at a fixed level by utilizing an extremely large, expensive capacitor connected to the high voltage. However, this solution is not practical from a cost standpoint, and therefore minor misregistration of different intensity (different average current) horizontal scan lines has been tolerated, but generally interlace excitation, particularly for even block graphics, was avoided since this magnified the horizontal misregistration effect.

It is believed that a prior "Conrac" system did provide horizontal compensation of an entire video display in response to overall video brightness changes by use of a series resistor between the power supply terminal of video brightness circuits and the CRT high voltage transformer. However, this was done just to maintain the horizontal picture size and this just occurred in response to changes in the overall video picture brightness. This prior compensation did not provide any horizontal orientation compensation between different horizontal lines, in a single video display, having different average video intensities.

SUMMARY OF THE INVENTION

An object of the present invention is to provide an improved CRT control system in which horizontal orientation is maintained between different sequential horizontal scan lines having different average beam currents for each scan line.

In one embodiment of the present invention a CRT control system is provided. The CRT control system comprises: CRT means, including at least a horizontal deflection yoke, an electron beam gun and a CRT screen effectively maintained at a high voltage potential, said CRT means receiving at least an amplified varying beam current intensity signal which is variable in accordance with at least horizontal beam position and a horizontal beam position sweep signal which determines horizontal beam position, said beam intensity and horizontal position signals together defining a desired horizontal line pattern on the CRT screen, at least several different horizontal lines capable of being effectively simultaneously displayed on said screen; video driver means, coupled to said CRT means, for receiving operative power and current from a first DC power supply signal provided at a power supply terminal and providing said amplified beam current intensity signal to said CRT means; horizontal deflection yoke driver means coupled to said CRT means for receiving horizontal sync pulses and providing, in response thereto, said horizontal beam position sweep signal to said CRT means, said horizontal position sweep signal having a varying magnitude and having a frequency determined by the frequency of said horizontal sync pulses; transformer means, having at least a primary winding, for receiving a periodic pulsed input signal having a frequency corresponding to said horizontal position sweep signal, as well as receiving a DC power input signal, and developing, in response thereto, both a high voltage DC output signal at a first transformer output terminal coupled to said CRT screen and a lower voltage power supply signal at a second transformer output terminal coupled to said video driver means, said lower voltage power supply signal determining said first DC power supply signal of said video driver means; wherein the improvement comprises, compensation circuit means connected in series between said second transformer output terminal and said video driver means power supply terminal for developing a compensating signal at said second transformer output terminal in accordance with each horizontal video scan line, said compensating signal having a frequency corresponding to the frequency of the horizontal position sweep signal and having a magnitude varying in accordance with the average current loading of each individual horizontal scan line, said compensating signal causing variation of the horizontal position of the electron beam to maintain horizontal orientation between different sequential horizontal scan lines regardless of average beam current loading of each horizontal line.

Essentially, the transformer means preferably comprises a primary winding which receives the DC power input signal at an internal tapped point of the winding and provides the high voltage DC output signal and the lower voltage power supply signal at other terminals of the primary winding. The horizontal deflection yoke driver means provides the pulsed input signal to a tapped terminal of the primary winding. This configuration essentially results in a flyback power supply with the transformer means providing both the high voltage DC output signal and the lower voltage power supply signal. Preferably, the compensation circuit comprises a capacitor connected in series between the second transformer output terminal and the video driver means power supply terminal. In addition, a resistor is connected in parallel with the capacitor and a diode is provided in parallel with the resistor and capacitor. This combination results in providing, as an input to the transformer means, a compensation signal related to the average beam current intensity associated with each horizontal scan line. This is assured by selection of the component values for the capacitor and resistor. The diode is provided so as to prevent the occurrence of a vertical line from appearing on the CRT screen face, wherein this line is apparently due to switching transients caused by the horizontal deflection yoke driver means.

In addition, the present invention illustrates that the compensation signal provided herein can also be utilized as a modulation input signal to the vertical deflection yoke means. By varying the vertical deflection yoke excitation signal in accordance with the present compensation signal, vertical variations between horizontal scan lines having different average beam current intensities can be compensated for.

Due to the operation of the present invention, horizontal and vertical orientation between different sequential horizontal scan lines can be maintained regardless of the average beam current intensity of each of these horizontal scan lines. This enables the present invention to produce clear vertical and horizontal graphic symbols despite the utilization of reverse video and/or despite even block interlace excitation of the CRT screen.

BRIEF DESCRIPTION OF THE DRAWINGS

For a more complete understanding of the present invention, reference should be made to the drawings in which:

FIG. 1 comprises a combination block and schematic diagram illustrating a scanning CRT control system utilizing the present invention;

FIG. 2 is a detailed schematic diagram illustrating the composition of several of the component blocks shown in FIG. 1; and FIG. 3 comprises graphical representations a and b which represent displayed CRT graphics provided without and with utilization of the present invention, respectively.

DESCRIPTION OF THE PREFERRED EMBODIMENTS OF THE INVENTION

Referring to FIG. 1, a block diagram of a scanning CRT (cathode ray tube) control system 10 is illustrated. The system 10 includes a conventional CRT 11 having a horizontal deflection yoke 12, an electron beam gun 13 represented by an AC excited filament 13, a CRT screen 14 typically maintained at a high voltage potential by virtue of its connection to a high voltage terminal 15, a vertical deflection yoke 16, a primary beam intensifying control comprising cathode 17, a brightness control grid 18 and a dynamic focus control grid 19, each connected to associated input terminals also identified by the same reference numbers. As is well understood, the electron beam gun 13 produces an electron beam whose intensity is primarily controlled by the cathode 17 and whose position on the CRT screen 14 is controlled by applying appropriate excitation currents to the horizontal and vertical deflection yokes. The present invention contemplates conventional operation of the CRT 11 such that the horizontal scanning rate is approximately 19 kilohertz while the vertical scan rate is substantially slower at a typical frequency of 60 hertz. Of course, other horizontal and vertical scan rates could be utilized if desired.

As is well understood, the electron beam intensity is controlled by the signal applied to the cathode 17, and this beam is swept across the CRT screen by applying signals to the yokes such that a dot matrix of individual dots, commonly referred to as pixels, is produced on the CRT screen. In the system 10, the intensity of each one of the video dots to be produced is determined by a video input signal provided at an input terminal 20 which is directly connected as an input to a video driver circuit 21 that provides an amplified video signal at a terminal 22 directly connected to the primary cathode 17. The video driver 21 is essentially just an amplifier of the video intensity signal provided at the terminal 20, and it receives operative power and current from a first DC power supply signal provided at a power supply terminal 23 also identified in FIG. 1 as the B1 terminal. This power supply terminal B1 also supplies power to an overall brightness control circuit 24 that essentially provides an adjustable DC voltage to the brightness control grid 18 so as to define the overall brightness of the CRT video display. It should be noted that the current drawn by the video driver 21 is related to the video intensity to be displayed on the CRT, and this current is provided from the voltage at the terminal B1 which is contemplated as being provided by a transformer circuit 50 to be later described.

As is well known, the current variations provided in the vertical and horizontal deflection yokes are determined in accordance with vertical and horizontal sync pulses, wherein in the system 10 the vertical sync pulses are provided at an input terminal 30 while the horizontal sync pulses are provided at an input terminal 40. The vertical sync pulse input terminal 30 is directly connected as an input to a conventional vertical deflection yoke driver 31 which, in response thereto, provides a vertical yoke current variation varying at the vertical sweep frequency, which is typically 60 hertz. The output of the vertical deflection yoke driver is provided at an output terminal 32 directly connected to the vertical yoke 16. It is contemplated that, as is conventional, the vertical deflection yoke driver 31 also provides a 60 cycle input signal to a dynamic focus circuit 35 which provides a dynamic focus bias voltage for the grid 19 that varies not only in accordance with vertical beam position, but also in accordance with horizontal beam position. This occurs by virtue of a direct input connection to the circuit 35 from a horizontal deflection yoke driver 41 that is directly connected to the horizontal sync pulse input terminal 40.

In response to the horizontal sync pulses at terminal 40, the horizontal driver 41 provides voltage switching pulses at an output terminal 42 that result in providing sawtooth waveforms for the horizontal deflection yoke current. The frequency of the pulses at the terminal 42 and the horizontal deflection yoke current is approximately 19 kilohertz for the system 10. The output pulses at the terminal 42, and/or the horizontal deflection yoke current resulting therefrom, can be considered a horizontal beam position sweep signal having a varying magnitude and having a frequency which is determined by the frequency of the horizontal sync pulses. The signal at the terminal 42 is also applied as an input to the transformer circuit 50 which also receives a relatively low magnitude DC power input signal provided at a terminal 51. In response to the switching pulses provided at the terminal 42 by driver 41 and the power signal provided at the terminal 51, the transformer circuit 50 provides a low level AC signal utilized to drive the CRT filament 13, as well as a high voltage DC output signal at a terminal 52 directly connected to the terminal 15 and a lower voltage, with respect to the high voltage signal at the terminal 52, power supply signal at a second transformer output terminal 53 which is coupled (inside circuit 50) to the video driver power supply terminal B1.

In the present invention, a compensation circuit (shown in FIG. 2) is connected in series between the second transformer output terminal 53 and the terminal B1, and this results in providing a compensating signal at the terminal 53 which varies in accordance with each horizontal video scan line. This compensating signal has a frequency corresponding to the frequency of the horizontal position sweep signal and has a magnitude that varies in accordance with the average current loading provided for each individual horizontal scan line. This compensating signal appears to cause a variation in either the horizontal beam position sweep signal corresponding to the horizontal deflection yoke current and/or the high voltage DC output signal provided at the terminal 52. In either event, the end result is that the horizontal position of scan lines is varied so that the horizontal orientation between different sequential horizontal scan lines is maintained regardless of the average beam current intensity provided for each of the horizontal scan lines. This insures proper horizontal orientation between sequential horizontal scan lines.

In addition, FIG. 1 illustrates that this compensation signal, provided at the terminal 53, can be optionally connected as a modulating control input signal to the vertical deflection yoke driver 31 by connecting it to a control terminal 33 of the vertical driver. This effectively results in modulating the vertical deflection yoke current provided by the driver 31 in accordance with video driver current loading variations since the signal at the terminal 53 will represent magnitude variations representative of the average current intensity of each horizontal scan line. Since the connection of terminal 53 to the vertical driver 31 is concerned with vertical beam position compensation, presumably an integrator circuit might average several of the horizontal scan line intensity variations and provide an appropriate variation of the vertical deflection yoke driver signal provided at the terminal 32 to thereby insure a lack of vertical variation between several horizontal scan lines having different average current loading.

The manner in which the present invention functions can best be illustrated by referring to FIG. 2 in which additional circuit details of the horizontal deflection yoke driver 41 and the transformer circuit 50 are illustrated.

In FIG. 2, the horizontal sync pulse input terminal 40 is shown as being eventually connected to a base input terminal 60 of an NPN transistor 61 having its emitter connected to ground and its collector connected to a terminal 62. A damper diode 63 is connected between ground and the terminal 62 and is connected in parallel with a capacitor 64. The terminal 62 is directly connected to the output terminal 42 of the horizontal driver, and the signal at the terminal 42 comprises pulses having the frequency of the horizontal sync pulses but provided by the switching action of the components 61 through 64, as well as various inductive reactances connected to the terminal 62. One of these inductive reactances comprises the horizontal deflection yoke 12 which is configured as shown in FIG. 2. In series with the horizontal deflection yoke 12 is illustrated an adjustable inductance 65 connected in parallel with a series resistor and capacitor circuit, wherein the inductance 65 is representative of the horizontal width adjustment inductance. In series with this inductance is a horizontal linearity coil 66 also connected in parallel with a series resistor-capacitor network with one end of the horizontal linearity inductor being connected to AC ground through a large capacitor 67. A series resistor-capacitor circuit is also connected across the horizontal yoke 12 as shown in FIG. 2.

Horizontal linearity coils and width adjustment inductances are conventional, and these components are just shown in FIG. 2 to illustrate that additional inductances are connected in series with the horizontal yoke 12. The yoke 12 receives pulse voltages at one end of the yoke 12 by virtue of the signals at the terminal 62 and has its other end coupled to AC ground. This results in a conventional sawtooth-shaped deflection yoke current being provided in the yoke 12. During a rising portion of the yoke current the electron beam is horizontally swept across the face of the CRT screen and during a falling or retrace portion of the yoke current the beam is repositioned for sweeping across the CRT. While the present invention can be utilized with conventional horizontal sweep excitation, it can also be utilized with interlace sweep excitation in which only half of the horizontal lines of a video display are first provided on the CRT screen and then the other half of interdigitated horizontal video lines are provided by interlacing the horizontal sweeping of the electron beam. During interlace sweeping the persistence of the CRT screen phosphors results in an apparent single video image on the screen.

The horizontal sweep pulses, provided at the terminal 42, are connected as an input to an internal tapped point 54 of a primary winding 55 of a transformer 56 which basically comprises most of the transformer circuit 50. The low DC power supply signal at the terminal 51 is also provided, through a diode 57, to an internal tapped point 58 of the primary winding 55. A first end terminal 59 of the primary winding 55 corresponds to a first transformer output terminal which is connected through a rectifying diode 70 to the high voltage output terminal 52 of the transformer circuit 50. A second end terminal of the primary winding 55 is shown as corresponding to the terminal 53 at which a lower voltage (as compared to the high voltage provided at the terminal 52) is provided. The terminal 53 corresponds to a second transformer output terminal. It should again be noted that optionally the terminal 53 can be brought out of the transformer circuit 50 and connected as a modulation input to the control terminal 33 of the vertical deflection yoke if compensation of the vertical deflection current for variations in electron beam loading is desired.

FIG. 2 illustrates that the transformer 56 has a secondary winding 71 across which a relatively low level AC signal is developed which is utilized as the drive signal for the CRT filament 13.

Essentially, a DC power supply signal is applied to the transformer 56 by virtue of the connection to the terminal 51. In response to the pulsing switching signal provided at the terminal 42, a very high voltage step-up transformation occurs providing the high voltage at the terminal 52, which is typically +15 kilovolts DC. The voltage at the terminal 51 is typically +24 volts. In addition, a lower magnitude, substantially DC, signal of +70 volts is provided by the primary winding 55 at the transformer output terminal 53. This terminal 53 will be utilized to provide the power supply signal at the terminal B1 that provides operative power to both the video driver 21 and the overall brightness control 24. This is accomplished in the present invention by virtue of a compensation circuit being connected in series between the terminals 53 and B1. FIG. 2 also illustrates that the terminal B1 is connected to AC ground by two parallel capacitors 72 and 73 which tend to insure that a relatively constant DC voltage is provided at the terminal B1.

The present invention provides for a compensation circuit connected in series between the terminals 53 and B1 wherein preferably this compensation circuit comprises the parallel combination of a capacitor 74, a resistor 75 and a diode 76. The magnitudes of the resistor and capacitive components utilized in the transformer circuit are illustrated in FIG. 2 and are selected such that the compensation circuit will develop a compensating signal at the terminal 53 which will vary in accordance with each horizontal video scan line. This compensating signal will have a frequency of 19 kilohertz corresponding to the horizontal line sweep frequency and will have a magnitude will vary in accordance with the average current loading of each individual horizontal scan line. In other words, for any particular horizontal scan line a certain average current will be drawn by the video driver circuit 21. If the next horizontal scan line draws a different amount of average current, this will cause a variation in the amount of current drawn from the terminal B1. Because an appropriate magnitude capacitor and resistive coupling network is provided by the components 74 and 75, this results in providing a compensating signal at the terminal 53 which has a magnitude that varies in accordance with the variations in the average horizontal scan line current being drawn of each horizontal line.

Because the present invention provides a compensating signal at the terminal 53 which is a measure of the average current drawn during each horizontal scan line, this affects the operation of the transformer 56 in that either a variation in the commencement of the horizontal deflection yoke current in the deflection yoke 12 will occur and/or a compensating variation in the magnitude of the high voltage at the terminal 52 will occur. In any event, the resultant effect is that the horizontal position of different scan lines will be varied such that the horizontal orientation between different sequential horizontal scan lines having different average beam current intensities (which means that they draw different average beam currents) will be maintained.

The effect of the present invention can best be illustrated by referring to FIG. 3 wherein graph a represents the resultant video display which may occur due to different average horizontal scan line beam current intensities if the present invention is not utilized. In graph a in FIG. 3, the horizontal misorientation which might be provided for a block letter E is illustrated wherein this misregistration is caused by the fact that the average current intensity for each horizontal scan line may be vastly different. Certainly this would be the situation if a series of horizontal E's were to be produced on the screen. In this case, clearly the first scan line representing the top of the E would have a substantially higher average current beam intensity than the next few lines, and similar variations would occur when the horizontal scan line representing the center of the E and the bottom of the E occur.

The horizontal misregistration in graph a is essentially caused because for a horizontal scan line having a high average beam current intensity, this larger beam current will tend to reduce the high voltage at the transformer output terminal 52. Even though beam current is relatively small, the output impedance of the transformer is extremely high such that variations in beam current can result in significant variations in the voltage at the terminal 52. When the voltage at the terminal 52 is decreased, as in the case of high average beam current for a scan line, the horizontal sweeping of the electron beam will tend to be extended beyond its normal limits. When this is contrasted with a subsequent low average beam current for the next horizontal line, horizontal misregistration becomes exaggerated and a result as shown in graph a in FIG. 3 can be produced. This effect is particularly noticeable when reverse video excitation and/or even block interlace excitation is utilized since these excitations result in large effective differences between the average current drawn by effectively sequential horizontal scan lines.

The present invention prevents such occurrences by controlling the operation of the horizontal sweeping of the electron beam in accordance with the average current provided by the electron beam during each horizontal scan line. This is achieved by creating a transient signal at the terminal 53 related to the average beam current drawn for each horizontal scan line. Because of this, embodiments of the present invention have been produced which can substantially eliminate horizontal misregistration between horizontal scan lines having different average current intensities. Thus, the result shown in graph b in FIG. 3 is achieved by the present invention.

It should also be noted that electron beam current variations can also result in vertical misregistration between sequential horizontal scan lines due to changes in the CRT high voltage, and that this, too, can be compensated for by coupling the beam current signal provided at the terminal 53 as a control input to the vertical deflection yoke driver 31. However, since the amount of vertical misregistration is typically much smaller than the amount of possible horizontal misregistration, this effect may not require compensation in all instances.

While specific embodiments of the present invention have been shown and described, further modifications and improvements will occur to those skilled in the art. All such modifications which retain the basic underlying principles disclosed and claimed herein are within the scope of this invention.

We claim:

1. A CRT control system comprising:
   CRT means, including at least a horizontal deflection yoke, an electron beam gun and a CRT screen effectively maintained at a high voltage potential, said CRT means receiving at least an amplified varying beam current intensity signal which is variable in accordance with at least horizontal beam position and a horizontal beam position sweep signal which determines horizontal beam position, said beam intensity and horizontal position signals together defining a desired horizontal line pattern on the CRT screen, at least several different horizontal lines capable of being effectively simultaneously displayed on said screen;
   video driver means, coupled to said CRT means, for receiving operative power and current from a first DC power supply signal provided at a power supply terminal and for receiving a video input signal and providing, in response thereto, said amplified beam current intensity signal to said CRT means;
   horizontal deflection yoke driver means coupled to said CRT means for receiving horizontal sync pulses and providing, in response thereto, said horizontal beam position sweep signal to said CRT means, said horizontal position sweep signal having a varying magnitude and having a frequency determined by the frequency of said horizontal sync pulses;
   transformer means, having at least a primary winding, for receiving a periodic pulsed input signal having a frequency corresponding to said horizontal position sweep signal, as well as receiving a DC power input signal, and developing, in response thereto, both a high voltage DC output signal at a first transformer output terminal coupled to said CRT screen and a lower voltage power supply signal at a second transformer output terminal coupled to said video driver means, said lower voltage power supply signal determining said first DC power supply signal of said video driver means;

wherein the improvement comprises, compensation circuit means connected in series between said second transformer output terminal and said video driver means power supply terminal for providing said first DC power supply signal to said video driver means in response to said lower voltage power supply signal and for developing a compensating signal at said second transformer output terminal in accordance with each horizontal video scan line, said compensating signal having a frequency corresponding to the frequency of the horizontal position sweep signal and having a magnitude varying in accordance with the average current loading of each individual horizontal scan line as indicated by the operative power current drawn by said video driver means, said compensating signal causing variation of the horizontal position of the electron beam to maintain horizontal orientation between different sequential horizontal scan lines regardless of average beam current loading of each horizontal line.

2. A CRT control system according to claim 1 wherein said compensation circuit means includes a capacitor connected in series between said second transformer output terminal and said video driver means power supply terminal.

3. A CRT control system according to claim 2 wherein said compensation circuit means includes a resistor in parallel with said capacitor.

4. A CRT control system according to claim 3 wherein said compensation circuit means includes a diode in parallel with said resistor and said capacitor.

5. A CRT control system according to claim 1 which includes a vertical deflection yoke means which determines the vertical position of said electron beam, and wherein said compensation circuit means is coupled to said vertical deflection yoke means for providing variation of the vertical position of said beam in accordance with said compensation signal and therefore in accordance with the video driver means current loading.

6. A CRT control system according to claim 1 wherein said transformer means primary winding receives said DC power input signal at an internal tapped point of said winding and provides said high voltage DC output signal and said lower voltage power supply signal at other terminals of said primary winding.

7. A CRT control system according to claim 1 which includes an overall video brightness circuit that receives operative power and current from a connection to said video driver means power supply terminal and provides an adjustable DC voltage to a grid electrode of said CRT means.

8. A CRT control system according to claim 4 which includes an overall video brightness circuit that receives operative power and current from a connection to said video driver means power supply terminal and provides an adjustable DC voltage to a grid electrode of said CRT means.

9. A CRT control system according to claim 8 wherein said transformer means primary winding receives said DC power input signal at an internal tapped point of said winding and provides said high voltage DC output signal and said lower voltage power supply signal at other terminals of said primary winding.

10. A CRT control system according to claim 9 which includes a vertical deflection yoke means which determines the vertical position of said electron beam, and wherein said compensation circuit means is coupled to said vertical deflection yoke means for providing variation of the vertical position of said beam in accordance with said compensation signal and therefore in accordance with the video driver means current loading.

* * * * *